Dec. 30, 1969     R. D. LINKIN     3,486,419
FLUID CYLINDER WITH PISTON RETAINING MEANS
Filed March 14, 1968
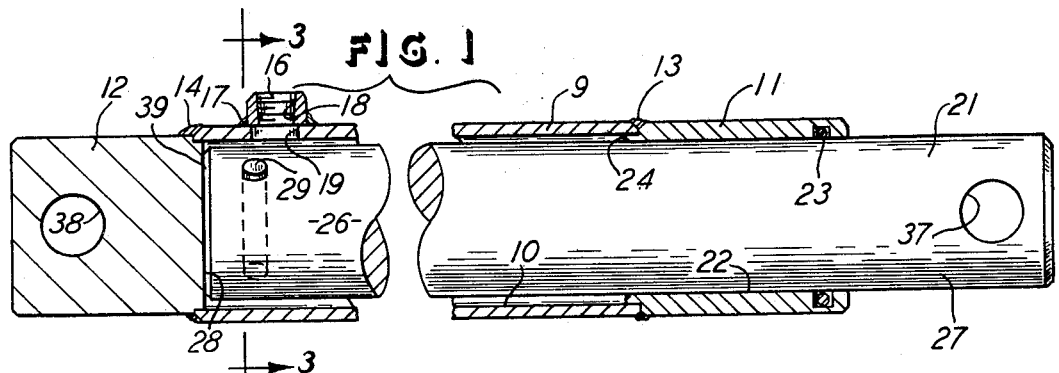
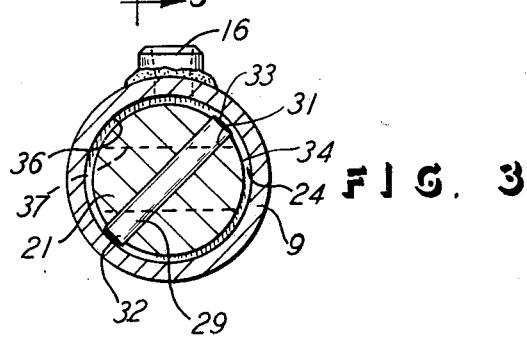
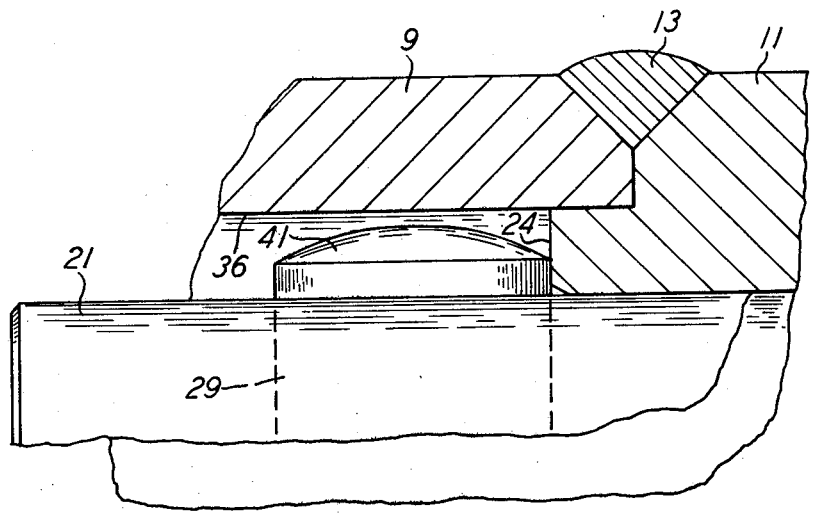
INVENTOR:
RODNEY D. LINKIN
ATTORNEY United States Patent Office 3,486,419
Patented Dec. 30, 1969

3,486,419
FLUID CYLINDER WITH PISTON RETAINING
MEANS
Rodney D. Linkin, Davenport, Iowa, assignor to J. I.
Case Company, Racine, Wis., a corporation of
Wisconsin
Filed Mar. 14, 1968, Ser. No. 713,159
Int. Cl. F16s 1/00
U.S. Cl. 92—128                              2 Claims

ABSTRACT OF THE DISCLOSURE

A fluid cylinder including a barrel defining an interior cavity, and a piston rod slidably disposed on a bearing piece attached to the barrel. A stop is inside the barrel, and a retainer piece is assembled with the inner end of the piston rod and the retainer piece engages the stop at the limit of retraction of the rod from the barrel. The retainer piece is assembled with the rod by inserting it through the fluid fitting on the barrel. The barrel, bearing piece, and end cap, are all welded together, but the retainer piece can still be installed and removed with respect to the rod and after the assembly is welded.

BACKGROUND OF THE INVENTION

This invention relates to a fluid cylinder with piston retaining means.

The prior art is already aware of the type of fluid cylinder which is welded, rather than threaded, together. In the threaded assembly, the construction can be taken apart for removal of the piston rod, when desired. However, in the welded assembly, there can be no disassembly of the parts, except for removal of the piston rod from the barrel, where the piston rod is retained in the barrel by means of a removable piece on the end of the piston rod.

However, in the welded assembly where the piston rod is removable, there is the problem of providing the means for retaining the piston rod within the barrel during operation of the fluid cylinder. These prior art assemblies usually have a fluid fitting near the one end of the barrel, and the fitting is available for inserting a screw driver or like tool for installing and removing a retainer piece with respect to the end of the piston rod. This retainer piece is then available for preventing the piston rod from being withdrawn from the barrel, when the fluid cylinder is in use. One such retainer use in the prior art is a snap ring, but this is difficult to install and remove with respect to the cylinder, when one is limited to working through the opening in the fluid fitting, as mentioned. Other types of retainers known in the prior art are also difficult to manipulate, require accurate and expensive working and machining of the rod as well as the retainer, require special dimensioning and arrangement of the cylinder parts, and they are commonly arranged and disposed so that they actually interfere with smooth action and good efficiency of the cylinder in that the retainer may move across the fluid passageway in flow communication with the barrel.

The present invention recognizes and avoids the aforementioned problems, and it does so with a construction which is easily manufactured, sturdy in its parts, the retainer means is easily installed and removed with respect to the rod, the entire assembly requires no special parts or special dimensions of the parts relative to each other, no special tools are required for installing and removing the retainer means, and the entire assembly is simple in construction and requires very little machining of parts.

BRIEF DESCRIPTION OF THE DRAWINGS

FIG. 1 is the longitudinal sectional view of a fluid cylinder incorporating an embodiment of this invention, with the central portion thereof broken away.

FIG. 2 is an enlarged view of a portion of FIG. 1, with the piston rod in a different position from that shown in FIG. 1.

FIG. 3 is a sectional view taken along the line 3—3 of FIG. 1.

DETAILED DESCRIPTION OF THE PREFERRED EMBODIMENT

The drawings show the fluid cylinder to include a cylindrically shaped barrel 9 defining an elongated and axially disposed cavity 10. One end of the barrel 9 has a bearing piece 11, and the other end has a cap 12, and the pieces 11 and 12 are welded to the respective ends of the barrel 9 by means of welds 13 and 14, respectively. A fluid fitting 16 is also secured to the barrel 9 by weldment 17. A fluid bore 18 extends through the fitting 16 and is in flow communication with an opening 19 in the barrel 9. Therefore, fluid can flow through the fitting 16 and into the barrel cavity 10, and the fluid can also reverse its flow in evacuating it from the cavity 10 and have it pass out through the fitting 16. A piston rod 21 is slidably received within the barrel assembly of the pieces 9, 11, and 12, and it is in snug sliding contact with the bore 22 of the bearing piece 11. Also, a fluid seal, such as the O-ring 23, is interposed between the circumference of the rod 21 and the wall defining the bearing piece bore 22.

The bearing piece 11 terminates in an annular shoulder 24 surrounding the rod 21, and the shoulder 24 provides a stop as described later. Thus the rod 21 has its end 26 disposed within the barrel 9, and it has an end 27 extending from the barrel 9.

With this much of the structure described, it should therefore be understood that introducing fluid under pressure and into the fitting 16, which is shown to be threaded for receiving a connection extending to a fluid pump or the like (not shown) will conduct the fluid into the cavity 10 and cause it to act on the end face 28 of the piston 21. The piston would then move to the right, as viewed in FIG. 1 and with respect to the barrel 9. In this manner, the fluid cylinder is arranged to perform the desired work.

However, with the structure desecribed to this point, there is nothing to prevent the piston rod 21 from being blown out of the barrel 9 by the fluid under pressure in the barrel cavity 10. To prevent this, a retaining structure is provided to stop the piston rod 21 in its limit of stroke or full extension so that it will not move completely out of the cavity 10. To do this, a retainer, in the form of a pin 29, is installed on the rod end 26 and is shown to project radially thereon. Thus the rod 21 has a hole 31 extending diametrically across, as shown clearly in FIG.

3, and the pin 29 is snugly received in the hole 31, and the pin has its opposite ends 32 and 33 extending slightly beyond the circumference, designated 34, of the rod 21. It will therefore be understood that the extending ends 32 and 3 of the pin 29 will abut the stop or shoulder 24 when the rod 21 is moved to the right, as shown in the position in FIG. 2. Here it will also be noted that the pin ends 32 and 33, as well as it is noted in FIG. 3, are relatively free of the wall 36 defining the barrel cavity 10. Thus the ends do not provide any drag or damaging force on the wall 36 as the piston rod is reciprocated along its axis and along the axis of the cavity 10, in the use of the fluid cylinder.

The pin 29 is related to the piston rod hole 31 so that the pin can be readily inserted and removed from the hole 31. Also, the cross-sectional area of the pin 29 is less than the cross-sectional area of either the fluid bores 18 or 19, so the pin can therefore be moved through the two fluid bores in the installation and removal of the pin.

It will therefore be understood that one need only form the hole 31 in the piston rod 21 and assemble the rod 21 with the barrel assembly and have the hole 31 aligned with the fluid bores 18 and 19. Then the pin 29 can be inserted through the fluid bores 18 and 19 and into the hole 31. The procedure can be reversed for removal of the pin 29 when it is desired to disassemble the cylinder by removing the rod 21 from the barrel 9.

To assure that the pin 29 does not fall out of the hole 31, the pin is shown to be of the length slightly greater than the diameter of the rod 21, so the pin will be retained by the wall 36 of the barrel 9, as mentioned. Also, the rod 21 is rotated to have the pin 29 disposed out of axial alignment with the fluid bores 18 and 19, and such rotated position is shown in FIG. 3. In this position, the pin 29 is therefore out of a position of alignment with the barrel fluid bore 19, so that the pin will not become lodged in the bore 19 and will not have to slide across the bore 19 in the reciprocation of the piston rod 21. To assure that the pin 29 remains out of alignment with the bore 19, the piston rod 21 has its connecting means, shown as a mounting hole 37, oriented as shown in FIGS. 1 and 3 to be out of any alignment with the plane of disposition of the pin 29. Also, the barrel cap 12 has its connecting means or opening 38 in alignment with the shown position of the piston rod hole 37. Of course it will be understood that the holes 37 and 38 are available for connection to mounting points for pins in the usual installation of the fluid cylinder between the two points or pins (not shown) in the use of the cylinder. The described orientation of the holes 37 and 38, with respect to the piston hole 31 permits the rod 21 to remain rotated with respect to the barrel 9 when the cylinder is mounted and in use in the normal manner. As shown, the orientation of the piston rod holes 31 and 37 is approximately forty five degrees apart or different.

Thus the piston rod 21 is shown to be of a uniform diameter throughout its length. Also, it has the beveled end 39 which permits the fluid to get to the end or surface 39 and be effective on the projected cross-sectional area of the rod 21 in forcing the rod to the right, as viewed in FIG. 1, when desired. The circumference 34 of the rod 21, and the barrel wall 36, therefore form a space therebetween, and this space is partly occupied by the pin ends 32 and 33. Also, the ends 32 and 33 are shown to be spherically shaped in the tips, such as the tip 41 in FIG. 2. This assures that the pin 29 will not scratch or gall the barrel surface 36, and it will not put any undue drag on the piston rod 21.

The entire arrangement of parts is such that no tools are needed for inserting the pin 29 into the piston bore or hole 31. Likewise, a pin can be removed from the hole 31 by simply aligning the pin 29 with the bore 19 and shaking the pin out of the hole 31.

While the description and drawings show a welded barrel assembly consisting of the barrel 9, bearing piece 11, and cap or head piece 12, it will be understood that the assembly can be cast into one piece, rather than be welded into one piece. Therefore, where the barrel assembly is referred to as being welded, this includes an assembly which is cast. Also, it will be understood that the pin 29 need not project on diametrically opposite sides of the piston rod or plunger 21. Obviously, the pin 29 could be received in a hole 31 in the rod 21, where the hole 31 extends only part way and radially into the rod 21, in the nature of a blind bore, and the pin could then be of a suitable length to fully extend into the shortened hole and to have a projecting end, such as the end 32 or 33, available for abutting the stop 24, all as described in connection with the full-length pin 29. Also, the pin 29 is free in the hole 31 to slide therein and adjust itself relative to the cylindrical wall 36. That is, as shown in FIG. 3, the pin is disposed downwardly with respect to the piston rod 21, and the pin upper end 33 is spaced from the wall 36, as also shown in FIG. 2. This permits the pin to be in light contact with the wall 36, and the pin then also can be easily installed and removed from the hole 31, as mentioned. With this arrangement, if the rod 21 were to be slightly misaligned with respect to the cylindrical wall 36, such as by slight cocking of the rod 21 in the barrel assembly described, such misalignment would not cause the retainer 29 to press on the wall 36 and damage the wall 36. That is, the pin 29 would be self adjusting, as it is simply of a length slightly greater than the diameter of the rod 21, but slightly less than the diameter of the cylindrical wall 36. The retainer assembly is therefore a self adjusting assembly.

What is claimed is:

1. In a fluid cylinder, a barrel having an axially extending elongated cavity, a fluid fitting secured to said barrel at one axial end thereof and having a fluid bore in fluid-flow communication with said cavity, a fluid-tight cap welded to said barrel at said one axial end thereof, a piston rod bearing piece welded to said barrel at the other axial end thereof, a piston rod axially disposed in said cavity and being slidably mounted in said bearing piece and extending from said barrel at said other axial end, said cap and said piston rod both having attachment means oriented with respect to said fluid fitting to maintain said piston rod in a first rotated position relative to said barrel when said barrel and said piston rod connect between two mounting points, a stop in fixed position in the interior of said barrel at said other axial end and being faced toward and projecting into said cavity, a retainer on said one end of said piston rod for engagement with said stop to secure said piston rod against sliding out of said barrel when said piston rod is slid in the direction toward said other axial end, the improvement comprising said piston rod having a radially extending piston rod hole axially aligned with said fluid bore of said fluid fitting when said piston rod is slid in said barrel to said one axial end of said barrel and when said piston rod is in a second rotated position in said barrel, said retainer being an elongated straight pin disposed in said piston rod hole and being of a length to extend therefrom radially beyond said piston rod a distance to abut said stop when said piston rod is slid in the direction toward said other axial end, said pin being of a cross-sectional size smaller than the cross-sectional size of said fluid bore in said fluid fitting for installation and removal of said pin with respect to said piston rod and through said fluid bore when said piston rod is in said second rotated position, the relative orientation between said piston rod hole and said attachment means being angulated to be on different planes along the axis of said cylinder for positioning said piston rod hole out of alignment with said fluid bore in said first rotated position of said piston rod in said barrel.

2. The subject matter of claim 1, wherein said piston rod attachment means is a mounting pin hole located in the end of said piston rod extending outside of said barrel, said mounting pin hole having its axis oriented angulated to the axis of said fluid bore in said fluid fitting when said piston rod is in said first rotated position, said straight pin having its length lying along a plane oblique to said axis of said mounting pin hole for maintaining said straight pin away from said fluid fitting during reciprocation of said piston rod.

References Cited

UNITED STATES PATENTS

| 1,846,299 | 2/1932 | Bristol | 92—168 XR |
| 2,724,368 | 11/1955 | Miller | 92—128 |
| 2,899,938 | 8/1959 | Gardner | 121—46 |
| 2,915,046 | 12/1959 | Larsen | 121—46 |
| 2,942,582 | 6/1960 | Dempster et al. | 92—168 |
| 2,997,026 | 4/1961 | Zimmerer | 92—128 |
| 3,065,734 | 11/1962 | Molzahn | 92—128 |
| 3,166,990 | 1/1965 | Hoffmann | 92—168 XR |
| 3,177,984 | 4/1965 | Taylor | 92—132 XR |

MARTIN P. SCHWADRON, Primary Examiner

LESLIE J. PAYNE, Assistant Examiner

U.S. Cl. X.R.

92—168